United States Patent [19]
Zeller et al.

[11] Patent Number: 5,555,425
[45] Date of Patent: Sep. 10, 1996

[54] MULTI-MASTER BUS ARBITRATION SYSTEM IN WHICH THE ADDRESS AND DATA LINES OF THE BUS MAY BE SEPARATELY GRANTED TO INDIVIDUAL MASTERS

[75] Inventors: Charles P. Zeller; Michael D. Durkin; Thomas H. Holman, Jr., all of Austin, Tex.

[73] Assignee: Dell USA, L.P., Austin, Tex.

[21] Appl. No.: 490,003

[22] Filed: Mar. 7, 1990

[51] Int. Cl.$^6$ .................................................. G06F 13/362
[52] U.S. Cl. ..................... 395/800; 395/293; 364/242.92; 364/DIG. 1
[58] Field of Search ..................................... 395/725, 800, 395/293; 364/242.92, DIG. 1

[56] References Cited

U.S. PATENT DOCUMENTS

| | | | |
|---|---|---|---|
| 4,626,843 | 12/1986 | Szeto et al. | 340/825.5 |
| 4,656,627 | 4/1987 | Hasley et al. | 370/85 |
| 4,837,736 | 6/1989 | Donaldson et al. | 395/184.01 |
| 4,967,344 | 10/1990 | Scavezze et al. | 364/DIG. 1 |
| 5,067,071 | 11/1991 | Schanin et al. | 395/275 |
| 5,119,292 | 6/1992 | Baker et al. | 395/725 |
| 5,148,545 | 9/1992 | Herbst et al. | 395/725 |
| 5,179,669 | 1/1993 | Peters | 395/325 |
| 5,179,705 | 1/1993 | Kent | 395/725 |

Primary Examiner—Alyssa H. Bowler
Assistant Examiner—John Harrity
Attorney, Agent, or Firm—Henry Garrana; Michelle Turner; Mark Kahler

[57] ABSTRACT

A multi-master digital computer system has a bus, a plurality of master devices connected to the bus, a plurality of slave devices connected to the bus, and a bus controller for arbitrating bus requests by the master devices and for granting the bus to a selected one of the plurality of the master devices. Each master device is capable of originating a bus cycle to transmit data to or receive data from a desired slave device. The bus controller grants the bus to a selected master device which enters an address master state and addresses the desired slave device. The selected master device is transferred to a bus master state where a data transfer to or from the slave device is initiated. The selected master device then transfers to a data master state unless the selected master device wants, and is permitted through an arbiter, to retain control of the bus. The bus controller grants a bus request to a requesting master device through to the arbiter. The requesting master device is transferred into the address master state while the selected master device is still in the data master state, thus performing a pipelining operation.

21 Claims, 7 Drawing Sheets

MULTI-MASTER BUS ARBITRATION SYSTEM IN WHICH THE ADDRESS AND DATA LINES OF THE BUS MAY BE SEPARATELY GRANTED TO INDIVIDUAL MASTERS

BACKGROUND OF THE INVENTION

1. Field of the Invention

This invention relates to multi-master digital computer systems. More particularly, it relates to such systems that provide pipelining of a requesting device onto a bus ms a master while the current master device is still accessing the bus.

2. Description of the Prior Art

In modern computer systems, a bus is commonly used to interconnect the various elements comprising the system to one another for the transfer of information carrying signals therebetween. For example, a central processor is typically connected to various memory devices and input/output devices via a bus structure to carry the signals necessary for the operation of each element of the system. Signals carried by the bus may include, for example, address signals, data signals, clock signals and other control signals. The bus must efficiently transmit such signals to all of the elements of the computer system connected to it for the intended functions and operations of the system to be carried out.

One of the principal indicia by which a computer system is judged is its speed of operation and therefore the volume of data which it can process in a given period of time. Because the bus is utilized in virtually every operation performed by the computer system, it is a key component whose operational characteristics have a tremendous effect on the overall performance of the computer system. For example, the speed of the computer system is limited to a large degree by the rate at which the bus is capable of responding to a series of commands and transferring data between one element and another.

One technique which has been used to increase the speed of data handling within a computer system is that of pipelining, which is the sequential writing of a plurality of data words onto a bus without receiving an acknowledgement that any of the words have been read out at their destination elements. For example, the burst mode data transfer of data by writing a word from one location to another along a bus upon the occurrence of each successive clock cycle is an example of pipelining.

Various forms of pipelining in the prior computer art are well known. For example, large scale vector machines have utilized pipelining of data into the registers, adders, and output buffers to save time. That is, data is entered into the first of a series of operational registers while the remaining registers have other data in them.

Also, address pipelining in single processor systems is used to increase bus efficiency in the prior art. In such a pipeline system, the master generates the address for the next cycle before the data for the current cycle has been transferred. In this manner, the slave can be decoding the address before the actual start of the cycle.

The advent of computer systems with multiple processors has greatly increased the speed with which complex data processing functions can be performed. In such prior art computers, a plurality of processors share common elements such as system memory, input/output devices, and bus structures. Both processors are capable of serving as a bus master to control the transfer of information to and from a slave device via the system bus. Although both processors can be performing computations simultaneously, only one can be a bus master at a time. Each processor must request the bus, be granted access to it to become the bus master, complete the intended transaction and then relinquish the bus and make it available to another bus master.

With respect to prior art multi-master systems, such as computer systems with multiple processors, when a current bus master is to give control of the bus to a requesting device, it will complete its current cycle before permitting the requesting device access to the bus as a master as indicated above. However, in U.S. Pat. No. 4,837,736 to Donaldson et al there is disclosed a multi-master system in which an uncompleted transaction by a bus master can be temporarily interrupted to allow bus cycles to be utilized by other bus masters in the interim period. For example, in Donaldson, a device to which a command transfer is directed by a bus master may not be able to return the requested data immediately and cycles by other devices are allowed on the bus between the command transfer and the return data transfer of the read transaction. While such a configuration may avoid periodic inadvertent interruptions of access to the bus during entire transactions, it does not permit an orderly optimization of the data transfer rates within a multi-master computer system by allowing two master devices to access a single bus at the same time.

The present invention extends the benefits of pipelining to multi-master systems. The current master relinquishes control of the bus in stages. This permits the requesting device to access the bus as a master and address the desired slave before the current master has given up control of the bus. In a multiprocessor system, where the bus is constantly accessed by different devices, a considerable performance increase is achieved.

BRIEF SUMMARY OF THE INVENTION

A multi-master digital computer system utilizes a pipelining technique to permit a requesting device to access a bus while the current master device is accessing the bus. In this inventive system, at least two devices capable of being masters are connected to a bus. At least one slave device is to be addressed by either of the two devices through the bus.

Upon start-up of the system, one of the two devices automatically becomes the current bus master.

A system bus controller has an arbiter that arbitrates between two or more requesting devices if they each request the bus for a bus cycle and grants the bus to one of the requesting devices. The selected device will move from a requesting state to a selected address master state, when the current bus master releases the address lines of the bus. The selected address master then addresses the slave device to set up a transfer of data. At this time, the current bus master becomes the current data master. When the current data master indicates that it is releasing the data lines of the bus, the selected address master becomes the selected bus master. Then the current data master transfers from the bus into an idle state. It is evident therefore, that the current master is the data master while the selected master is the address master. In the case where there are only two possible master devices, there is no arbitration because one of the devices will always be a master device with no need to arbitrate. However, in those cases, the arbiter is used to generate a bus grant signal to the requesting device, in this preferred embodiment.

It should be noted that the system memory may be divided and physically associated with one or more of the master devices. The memory of one master device is accessible through a bus cycle to the other master device in a master-slave relationship, as described above. A memory reference by a master device to its associated memory does not require the bus.

The master and slave devices are known in the art. The bus controller is an array of logic to be described below.

The principle object of this invention is to provide a multi-master digital computer system that has a pipelining facility for a requesting device to access a bus while a current master device is still accessing the bus. This and other objects will be made evident in the detailed description that follows.

DETAILED DESCRIPTION OF THE INVENTION

A current master device controls a bus and occupies the bus master state. A requesting device wishing to control the bus enters the requesting state. In response to a grant from an arbiter and an address release indication from the current bus master, the requesting device enters the address master state. In response to a data release indication, the requesting device becomes the bus master. This cycle is repeated for each exchange of bus mastership. The bus is pipelined in that the address and data portions of the bus are accessed by two different masters simultaneously. The details of this pipelining are described below.

Figure 1:
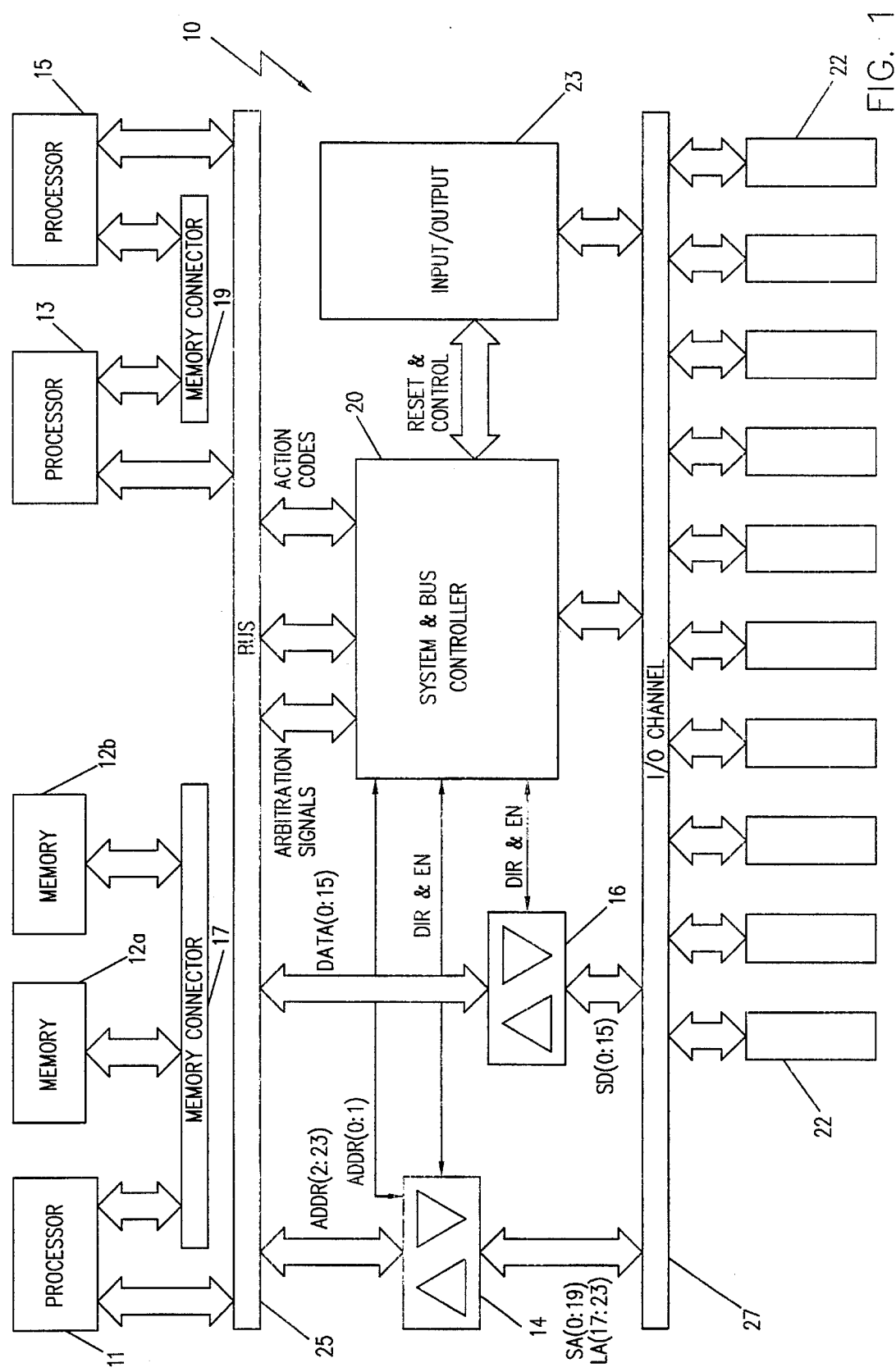
FIG. 1 is a block diagram of the multi-master digital computer system of this invention.

FIG. 1 illustrates a multi-master digital computer system 10 having separate processors 11, 13, and 15. Memories 12a and 12b are associated with processor 11 through memory connector 17. Any access made to those memories by processor 11 is a local memory reference and is not pertinent to this invention. In this preferred embodiment, memories 12a and 12b are dynamic random access memories (DRAMs). Processors 13 and 15 may access memories 12a or 12b through processor 11. In this system, such memory access is made by a requesting processor (13 or 15) which becomes the master device to processor 11 and its associated memory 12a or 12b which becomes the slave device. The memory bus cycle and the I/O bus cycle are the same except for a memory or I/O cycle designation, and the address of the slave device. Processors 11, 13, and 15 are interconnected through bus 25. Address and data signals are transmitted to the I/O channel 27 by bi-directional drivers 14 and 16, respectively. These drivers are controlled by System and Bus Controller 20 through the DIR and EN signals, as shown. Arbitration signals are developed by an arbiter in controller 20 (see FIG. 4), as well as action codes, to be described later. Input/Output 23 represents the various peripheral devices. Controller 20 includes a slave state machine for I/O and memory bus cycles (see FIG. 6), to be described below.

Controller 20 and Input/Output 23 are connected to I/O channel 27. The system address (SA), system data (SD), and the local address (LA) are applied to I/O channel 27 as gated by controller 20 through drivers 14 and 16. Slots 22 may be used for extra peripheral devices or additional memory. Additional memory is accessed through a memory bus cycle to the I/O channel.

Figure 2:
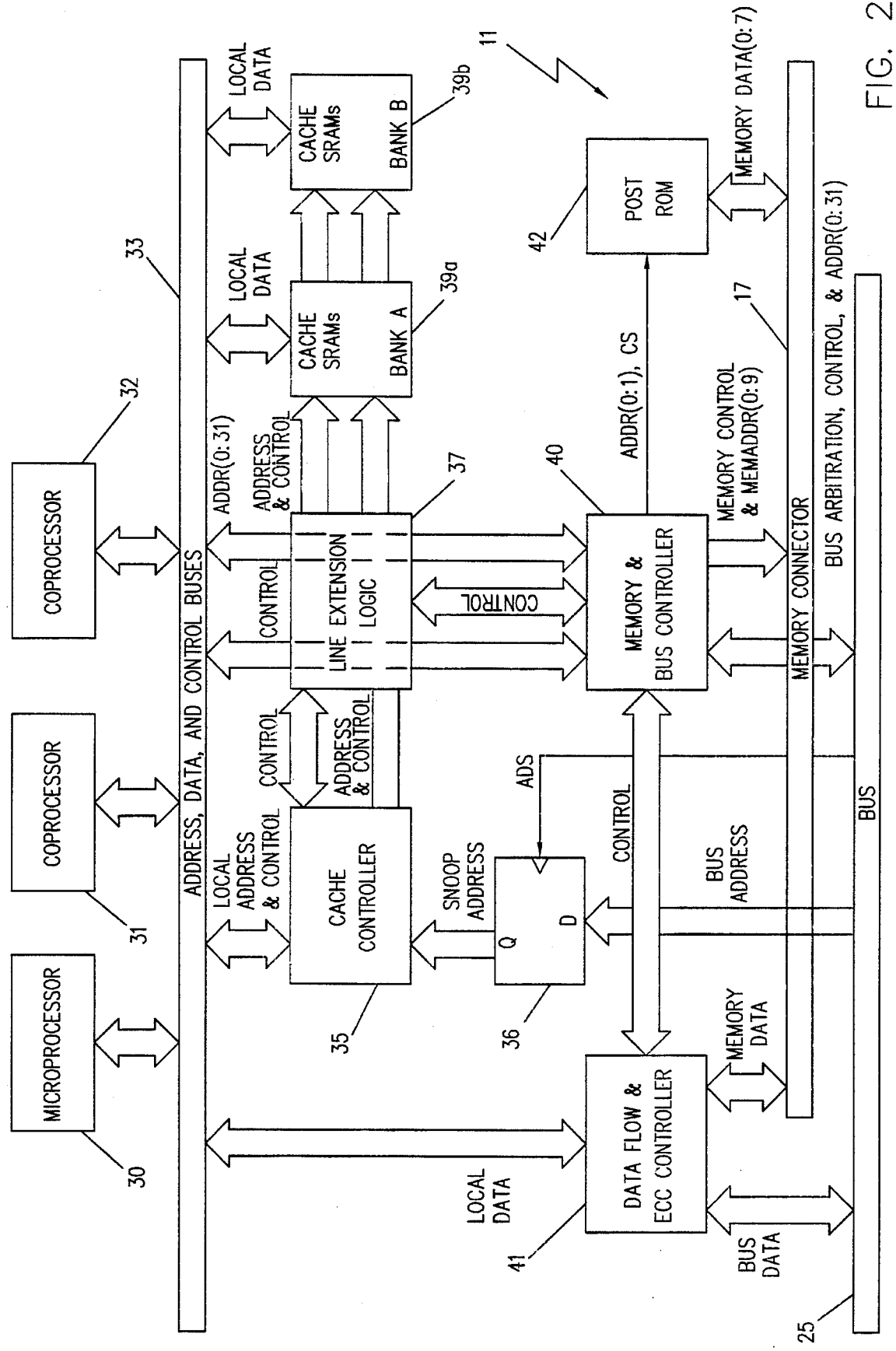
FIG. 2 is a block diagram of a single master processor.

FIG. 2 illustrates processor 11 in block form. Processor 11 is made up of micro-processor 30 and coprocessors 31 and 32. In this preferred embodiment, microprocessor 30 is an Intel Type 30386, coprocessor 31 is an Intel Type 30387, and co-processor 32 is a floating point unit made by Weitek Company. Of course, other types of microprocessors and coprocessors could be used as well. All are inter-connected through address, data, and control buses 33. Cache controller 35 connects to bus 33 and also through line extension logic 37 to cache SRAMs 39a and 39b. Snoop address latch 36 latches bus addresses and sends them to cache controller 35. Data Flow and ECC Controller 41 is connected to bus 33 and receives local data therefrom. Controller 41 is connected to Memory and Bus Controller 40 which is also connected to bus 33, receiving and transmitting control and address information. Memory and Bus Controller 40 includes a master state machine for all memory and I/O bus cycles in which processor 11 is the master device, and a slave state machine for all memory bus cycles in which processor 11 is the slave device. POST ROM 42 is a Read Only Memory (ROM) used for a power-on, self-test. Controllers 41 and 40 and POST ROM 42 are shown connected to memory connector 17. Controllers 40 and 41 are also connected to bus 25.

Figure 3:
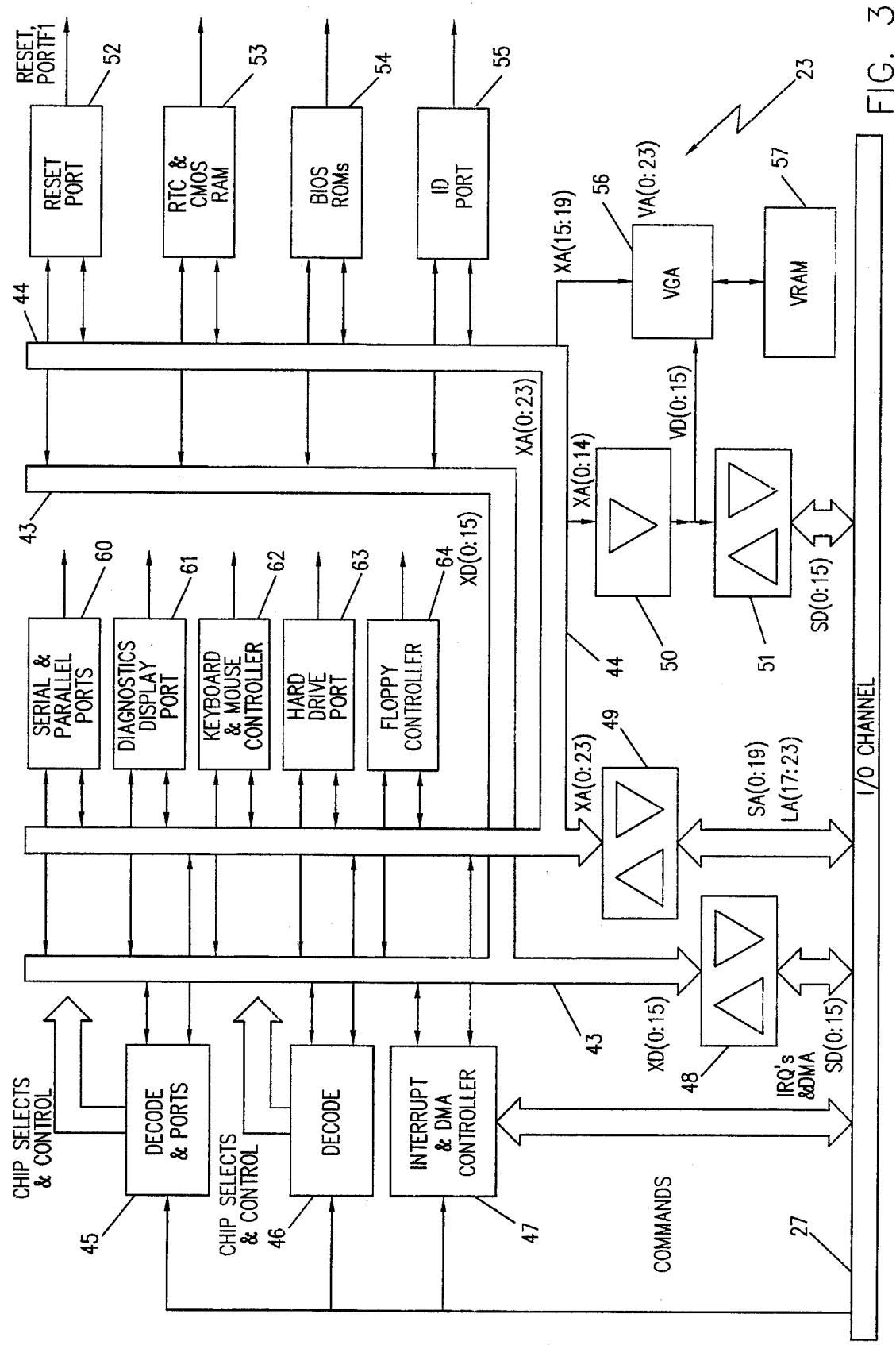
FIG. 3 is a block diagram of the Input/Output section of the multi-master system.

FIG. 3 is a block diagram of Input/Output 23. I/O channel 27, as shown in FIG. 1, is the communication link between the processors and the various Input/Output devices shown in FIG. 3, including decoders 45 and 46 and Interrupt and DMA controller 47. The Input/Output devices 52–57 and 60–64 are all controlled by way of I/O channel 27 through hi-directional drivers 48 and 49. VGA 56 is a video graphics adapter with images controlled from VRAM 57.

Figure 4:
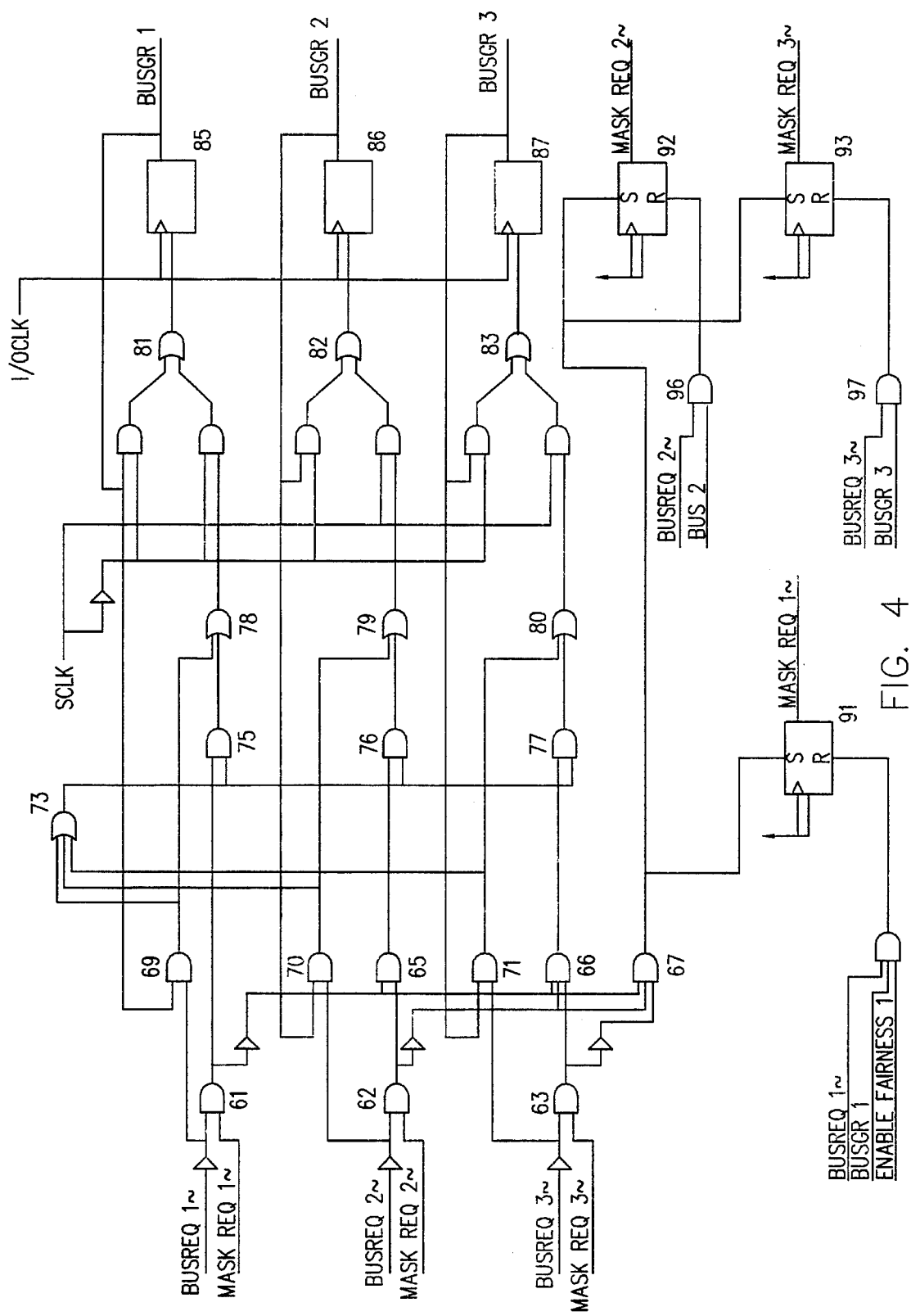
FIG. 4 is a schematic diagram of the arbiter of this invention.

The schematic diagram of the arbiter is shown in FIG. 4. The arbiter is implemented in a gate array in this preferred embodiment, but could be implemented in a PAL (Programmable Array of Logic), or other logic arrays.

In the discussion that follows a "/" represents "not asserted"; a "*" represents logic "AND"; a "+" represents logic "or"; a "~" represents that the signal preceding is true when low.

The arbiter assigns the next bus master device in response to one or more bus requests (BUSREQ~). The next current master device follows a specified controlled sequence not involving the arbiter to transfer the bus control. The arbiter provides a bus grant signal (BUSGR) to signal a requesting master device that it is the bus master elect. An arbitration busy signal (ARB-BUSY), indicating that one or more master devices is currently requesting the bus, is provided by the NAND of all of the BUSREQ~ signals. The arbiter implements priority arbitration by bus position when issuing a new BUSGR signal. The arbiter implements fair requesting; that is, a mask is maintained for each BUSREQ~ signal. The mask is set when the corresponding BUSGR signal is asserted to allow a current requesting device access to the bus. All masks are reset when there are no asserted, unmasked BUSREQ~ signals.

AND gates 61 62, and 63 receive input signals BUSREQ1~ (inverted) and MASK REQ1~, BUSREQ2~

(inverted) and MASK REQ2~, and BUSREQ3~ (inverted) and MASK REQ3~, respectively. The input signals represent a bus request by three masters and an accompanying mask request, the mask request being determined by circuitry shown in FIG. 4 to be mentioned later. AND gates 69, 70, and 71 each receive as one of its inputs, the signal BUSREQ1. AND gates 65, 66 and 67 each have, as one input, the inverted output from AND gate 61. The other input to AND gate 65 is from the output of AND gate 62. The other inputs to AND gate 66 are from the inverted output of AND gate 62 and the output from AND gate 63. NAND 67 has as inputs, the inverted outputs from AND gates 61, 62 and 63. The output signal from NAND gate 67 is a Clean All Masks~ signal which is applied, as shown, to the set inputs of flip-flops 91, 92 and 93.

NOR gate 73 has its three inputs from the outputs of AND gates 69, 70 and 71, respectively. The output from NOR gate 73 is applied as an input to each of AND gates 75, 76 and 77. The other input to AND gate 75 is from the output of AND gate 61. The other input to AND gate 76 is from the output of AND gate 65. The other input to AND gate 77 is from the output of AND gate 66. OR gate 78 has inputs from gates 69 and 75, respectively. OR gates 79 and 80 have inputs from AND gates 70 and 76, and 71 and 77, respectively.

One AND gate in each of AND-OR trees 81, 82 and 83 receive inputs from AND-OR trees 78, 79 and 80 and signal SCLK, respectively. The other AND gate in each of AND-OR trees 81, 82 and 83 receive signal SCLK--. Output latches 85, 86 and 87 are each clocked by signal I/O CLK and receive inputs from AND/OR trees 81, 82 and 83, respectively. The outputs of latches 85, 86 and 87 are signals BSUGR1, BUSGR2 and BUSGR3, respectively and are applied to the other input of the other AND gates in each of AND-OR trees 81, 82 and 83, respectively.

Signal BUSGR1 is also applied as the other input of AND gate 69. Signal BUSGR2 is applied as the other input to AND gate 70. Signal BUSGR3 is applied as the other input to AND gate 71.

As indicated above, the output from NAND gate 67 sets the MASK request flip-flops 91–93. On the other hand, NAND gates 95, 96 and 97 reset flip-flops 91, 92 and 93, respectively. The inputs to NAND gate 95 are Signals BUSREQ1~, BUSGR1 and ENABLE FAIRNESS1. This latter signal is set to a low voltage if fairness is desired. In that case, the output from NAND gate 95 will reset flip-flop 91 so that signal MASKREQ1 is low. With that signal low, the output from AND gate 61 will also be low. In the same manner, the inputs to NAND gates 96 and 97 are BUSREQ2 and BUSGR2, and BUSREQ3 and BUSGR3, respectively. The outputs from NAND gates 96 and 97 reset flip-flops 92 and 93, whose outputs are MASKREQ2~ and MASKREQ3~, respectively.

If MASK REQ2~ is low, then the output from AND gate 62 is low, disabling BUSREQ2~. If MASKREQ3~ is low, than BUSREQ3~ is disabled. In those situations, BUSGR2 and BUSGR3 will not be active.

Without the ENABLE FAIRNESS1 signal being active, the grant signals will come in order of priority, starting with BUSGR1, in this preferred embodiment.

Figure 5:
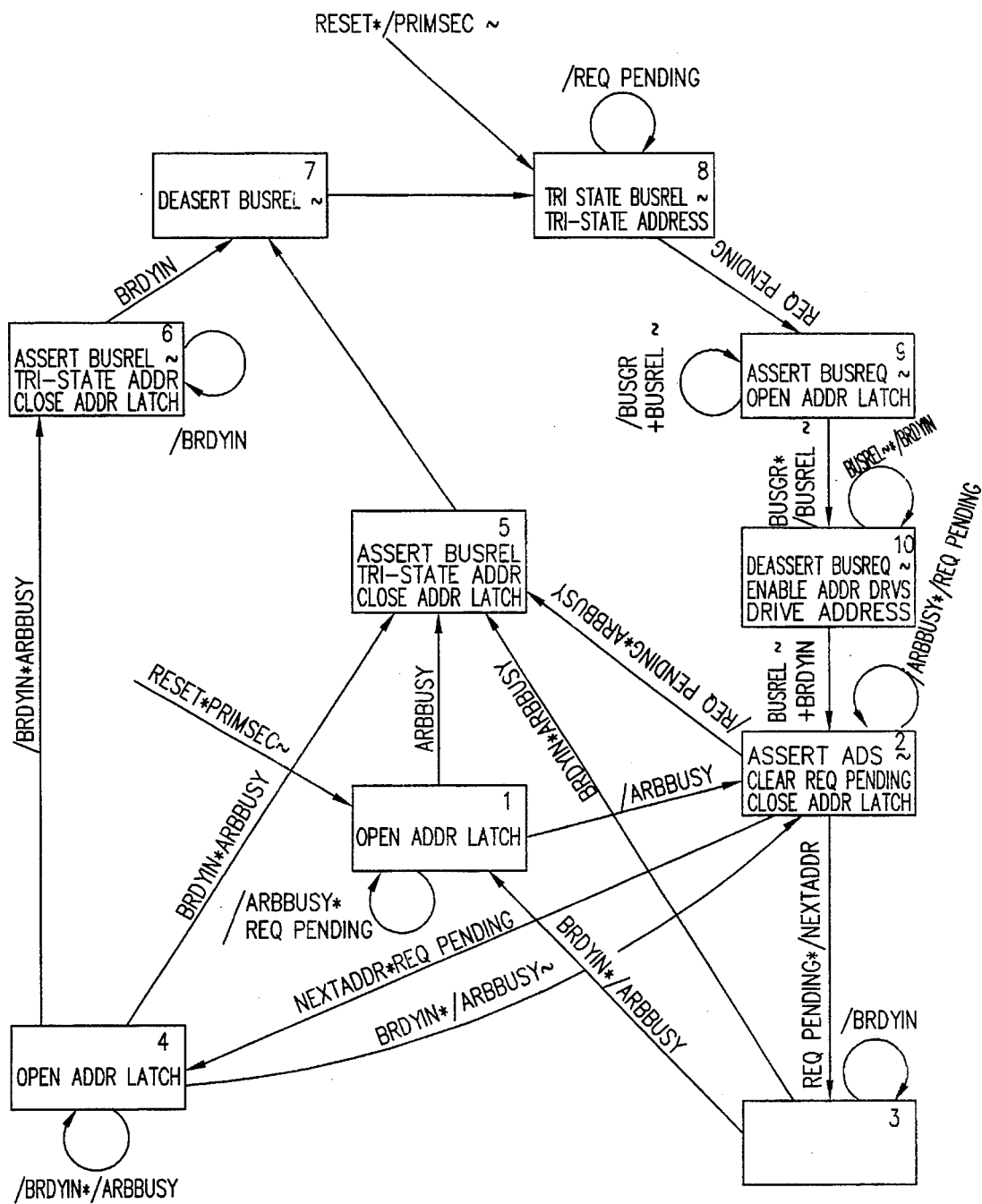
FIG. 5 is a state diagram of the master state machine of this invention.

FIG. 5 is a state diagram of the bus master state machine. In this preferred embodiment the bus master state machine, shown in the FIG. 5 state diagram is implemented in a Gate Array. It could also be implemented in a PAL or other logic arrays. The nomenclature "tri-state" and "tri-stated" means the removal of the control signal from a driver so that the driver output is neither high nor low, but is floating.

The states are numbered 1–10 and are entered and exited by the presence of input signals. For example, in state 1 which is entered on the signal, RESET and PRIMSEC~ being asserted from system 10, with the arbiter not busy, and no requests for the bus pending, the state machine remains in state 1. In state 1, the address latch is opened to permit entry of any selected address present at the input to the latch. However, as soon as ARBBUSY is not asserted, state 2 is entered. Also, if input signal ARBBUSY from the arbiter is asserted, then state 5 is entered from state 1. At that point, the address is tri-stated, the address latch is closed and signal BUSREL~ is asserted, and state 7 is unconditionally entered from state 5. Then the address is tri-stated, the address latch is closed and signal BUSREL~ is asserted, and state 7 is unconditionally entered from state 5.

The state machine remains in state 2 so long as signals ARBBUSY AND REQ PENDING are not asserted. If signal ARBBUSY is asserted, then state 5 is entered. If there is a REQ PENDING and NEXT ADDR is not asserted, then state 3 is entered. If there is a REQ PENDING and NEXT ADDR is asserted, then state 4 is entered. In either event, upon leaving state 2, signal ADS~ is asserted, REQ PENDING is cleared and the address latch is closed, except when entering state 5 if ARBBUSY is not asserted, as indicated above. Signal ADS~ is a confirmation of appropriate address and control signals, to be described with respect to FIG. 7. Also, if input signal ARBBUSY from the arbiter is asserted, then state 5 is entered from state 1. At that point, the address is tri-stated, the address latch is closed and signal BUSREL~ is asserted, and state 7 is unconditionally entered from state 5.

If NEXT ADDR and REQ PENDING are asserted, state 4 is entered from state 2. If NEXT ADDR is not asserted, then state 3 is entered from state 2. If neither NEXT ADDR or BRDYIN is asserted, the state machine remains in state 3. However, when signals NEXT ADDR and ARBBUSY are asserted and signal BRDYIN is not asserted, then state 6 is entered from state 3. If NEXT ADDR is asserted, and signals ARBBUSY and BRDYIN are not asserted, then state 4 is entered from state 3.

Also from state 3, state 1 is re-entered when signal BRDYIN is asserted and signal ARBBUSY is not asserted, indicating that arbiter is not busy and the slave is ready. State 5 is entered from state 3 when the arbiter is not busy and the slave is ready, indicated by signals BRDYIN and ARBBUSY being asserted.

When signals BRDYIN and ARBBUSY are not asserted, the state machine remains in state 4. If signal BRDYIN is asserted and neither ARBBUSY nor REQ PENDING are asserted, state 1 is reentered from state 4. When signals BRDYIN and REQ PENDING are asserted and signal ARBBUSY is not asserted, then state 2 is reentered from state 4. When only signals BRDYIN and ARBBUSY are asserted, state 5 is entered from state 4. When signal ARBBUSY is asserted and signal BRDYIN is not asserted, then state 6 is entered from state 4.

In state 5, signal BUSREL~ is asserted, the address is tri-stated, and the address latch is closed.

In state 6, the same signals as in state 5 are asserted but the state machine remains in state 6 as long as signal BRDYIN is not asserted. When it is asserted, then state 7 is entered from state 6.

State 8 is entered when RESET is asserted and PRIMSEC~ is not asserted from system 10 or unconditionally from state 7. In state 8, signal BUSREL~ is tri-stated and the address is tri-stated. As long as there is no REQ PENDING, then the state machine remains in state 8. Upon a REQ PENDING, state 9 is entered where signal BUSREQ~ is asserted and the address latch is opened. As long as there is no bus grant or a bus release, as indicated by no assertion of signal BUSGR or signal BUSREL~, the state machine remains in state 9. When signal BUSGR is asserted and signal BUSREL~ is not asserted, then the state machine moves from state 9 to state 10.

In state 10, signal BUSREQ~ is deasserted, the address drivers are enabled and the address is driven. As long as signals BUSREL~ and BRDYIN are not asserted, the state machine remains in state 10. However, when signal BUSREL~ or signal BRDYIN is asserted then state 2 is entered.

Figure 7:
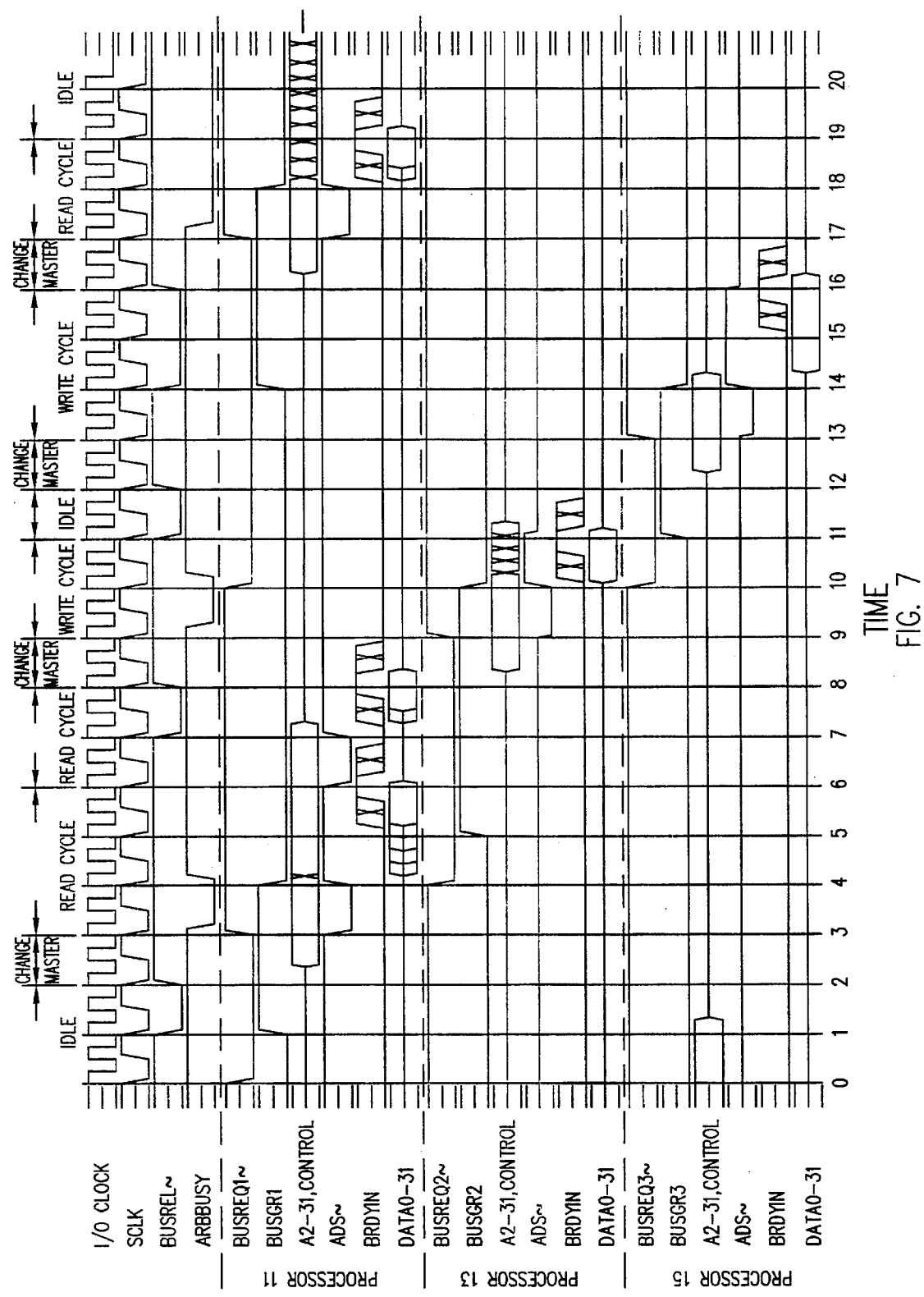
FIG. 7 is a timing diagram illustrating the timing relationships of the invention.

This state diagram should be studied in conjunction with the timing diagram of FIG. 7 for a complete understanding of the structure and operation of this invention.

Figure 6:
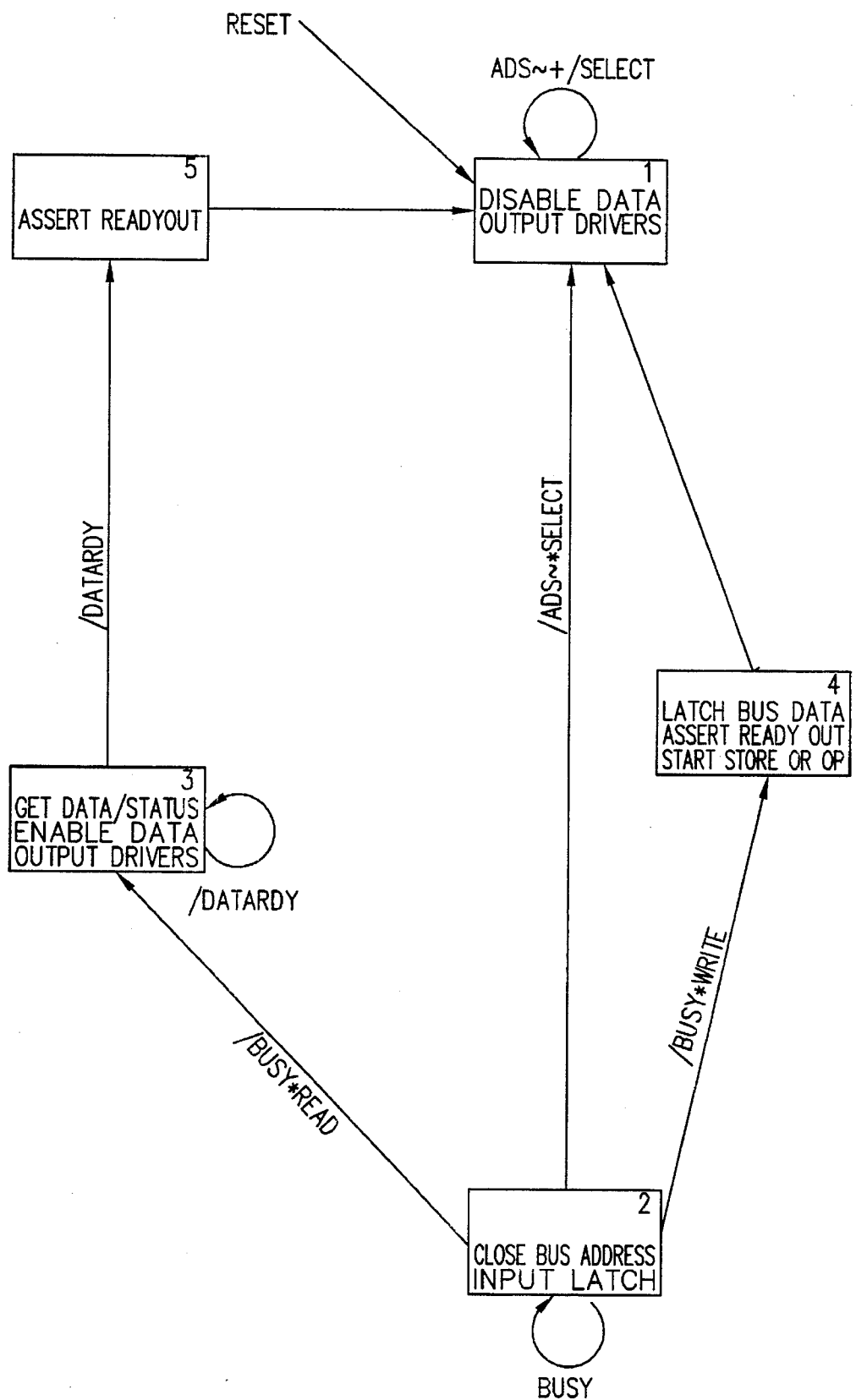
FIG. 6 is a state diagram of the Input/Output and memory slave state machine of this invention.

FIG. 6 is a state diagram of the bus slave state machine which is present in memory and bus controller 40 in each of the processors, for a non-local memory cycle, and is present in system and bus controller 20 for a bus cycle, either I/O or memory. The conventions mentioned with respect to the bus master state machine of FIG. 5 applies as well to the state diagram shown in FIG. 6. State 1 is entered by the assertion of input signal RESET from system 10. With ADS~ asserted and signal SELECT not asserted, the state machine stays in state 1. In state 1, the output signal generated disables the data output drivers. When signal ADS~ is not asserted, and SELECT is asserted from system 10, indicating selection of a particular device, then state 2 is entered where the bus address input latch is closed to any further address. As long as BUSY is asserted, indicating that the selected device is not ready for a bus cycle, the state machine remains in state 2. If BUSY is not asserted and WRITE is asserted, then state 4 is entered from state 2. However, if BUSY is not asserted and READ is asserted, then state 3 is entered from state 2.

In state 4, the output commands include latching the bus data, asserting a READYOUT and starting a memory store or I/O operation. The READYOUT signal generates signal BRDYIN which is shown in FIG. 5 and also is used to indicate the end of the cycle as shown in FIG. 7.

In state 3, the output signals include GET DATA/STATUS and ENABLE DATA OUTPUT DRIVERS. As long as there is no data ready, indicated by the deassertion of signal DATARDY, the state machine remains in state 3. When the DATARDY signal is asserted, then state 5 is entered and a READYOUT signal is asserted.

State 1 is entered from either state 4 or state 5 unconditionally.

In state 4, the store operation is started for memory, or an I/O operation is started.

In state 3, data from memory is received or status from some device is received. When such data or status is received, then the data output drivers are enabled to send the information to the master device.

MODE OF OPERATION OF THE INVENTION

Refer again to the drawings and particularly to FIG. 7. In the ensuing discussion, reference to "the bus" is a reference to bus 25. Bus 25 handles addresses and data, and references made to the "data bus" and to the "address bus" refer to those portions of bus 25.

In FIG. 7, the I/O clock synchronizes transfers from the processors to the Input/Output (I/O) system, and is asynchronous to the processors' clock. Clock SCLK is at a frequency one-half that of the I/O clock. In this preferred embodiment, Clock SCLK is at a frequency of 16 Mhz. SCLK clock periods begin on the rising edge of I/O clock when SCLK is high, for example, at time 0.

At time 0, processor 15 is the bus master, in control of the address bus(A2-31, CONTROL) and the data bus (DATA 0-31). Also at time 0, the bus request signal BUSREQ1~ from processor 11 goes true (low) indicating an assertion of the request by processor 11 for the bus to access a slave device. The BUSREQ1~ signal is developed as shown in FIG. 5. The arbiter busy signal ARB-BUSY is driven true (high) by BUSREQ1~.

At time 1, the bus release signal BUSREL~ which is active both low and high is driven low by processor 15 in response to ARB-BUSY being asserted high. Also, the bus grant signal BUSGR1 for processor 11 from the arbiter is asserted true (high). Signal BUSREL~ is developed as shown in FIG. 5. With respect to processor 11, it has requested the bus, processor 15 has released the address bus, and the arbiter has granted it to processor 11 and, therefore, processor 11 can now take control. Shortly thereafter, signal A2-31, CONTROL for processor 15 goes into a tri-stated condition. Note that all of the bus cycles shown in FIG. 7 may be either memory or I/O bus cycles.

For an understanding of the generation of the grant signals BUSGR1–BUSGR3 see FIG. 4. When BUSREQ1~ is true (low) and MASK REQ1~ is false (high) then a high output from AND gate 61 is issued and applied to AND gate 75. With all three inputs to NOR gate 73 low, because none of signals BUSGR1–BUSGR3 is high, gate 75 issues a high signal which is applied through AND-OR tree 81 to set latch 85 upon I/O CLK. Signal BUSGR1 goes high and is applied to AND gate 69 which is applied to OR gate 78 and is clocked through AND-OR tree 81 back to OR gate latch 85 to maintain signal BUSGR1 high until such time as signal BUSREQ1~ gs false (high). The same analysis applies to the generation of signals BUSGR2 and BUSGR3.

Referring again to FIG. 7, at time 2, processor 11, in view of BUSREL~ being low, shifts into the address master state. Shortly after time 2, signals A2-31 and CONTROL for processor 11 become active. Also at this time, processor 15 gives up the data bus by driving BUSREL~ high. This allows processor 11 to take control of the data bus at the next clock. The control signals represented as CONTROL are those associated with the normal operation of the '386 microprocessor including WRITE OR READ (W/R~), memory or I/O (M/IO~), DATA or CONTROL (D/C~). The various combinations of these control signals form the bus cycles that could be executed.

At time 3, processor 11, in view of BUSREL~ being high, shifts into the bus master state, controlling both the address and data bus. Note that signal BUSREL~ has two active states: low indicating to a requesting master that it can become the address master, and high indicating that the address master can become the bus master (address and data master).

Also, at time 3, signal BUSREQ1~ goes false (high) which causes signal ARB-BUSY to go false (low) indicating that the requesting has ended. Signal ADS~ goes true (low), to indicate that signals A2-31 and CONTROL are valid.

At time 4, signal BUSGR1 goes false (low) indicating that the arbitration is over, and signal ADS~ goes false (high). Also, signal BUSREQ2~ goes true (low) indicating that processor 13 wants the bus. Note that signal BUSREL~ remains high signifying that the bus has not been released by processor 11. Signal ARB-BUSY goes true (high) because of the bus request from processor 13. Also, signal DATA0-31 goes active for processor 11. Note that during this time period the signals A2-31 and CONTROL for processor 11 go inactive but then immediately go active for the next bus cycle. At this point, processor 11, the bus master, is both the address master and the data master at the same time.

At time 5, signal BUSGR2, the bus grant for processor 13, goes true (high) but, since the BUSREL~ signal remains high, processor 13 cannot access the bus and processor 11 retains control. Signal BRDYIN is asserted by the slave device to processor 11. This is a ready signal generated by the slave state machine as shown in FIG. 6 as READY OUT which generates signal BRDYIN.

At time 6, signal ADS~ for processor 11 goes true (low), signaling the validity of signals A2-31 and CONTROL for processor 11's second bus cycle. Shortly after time 6, DATA0-31 for processor 11 goes inactive.

At time 7, processor 11 releases the address bus as indicated by signal BUSREL~ being driven low. This, combined with BUSGR2 signal high, allows processor 13 to access the bus as address master at time 8. Also at time 7, processor 11 completes its second cycle with the deassertion of ADS~, the indication of valid DATA0-31, and the assertion of BRDYIN by the slave device. Following time 7, the A2-31, CONTROL signal for processor 13 becomes active illustrating that processor 11 is now only the data master.

At time 8, processor 13, in view of BUSREL~ being low, becomes the address master. At this time, processor 11 is the data master, while processor 13 is the address master. Also at time 8, processor 11 drives signal BUSREL~ high which will allow processor 13 to become the bus master at time 9.

At time 9, signal BUSREQ2~ goes false (high) indicating the end of the bus request, and signal ADS~ for processor 13 becomes true (low), signaling the validation of signals A2-31 and CONTROL for processor 13. Following time 9, signal ARB-BUSY goes false (low). As mentioned above, processor 13 becomes the bus master.

Following this detailed description, the mode of operation follows a pattern so that minute detail of the description of the remainder shown in FIG. 7 need not be made. For example, a bus request is made by a device seeking access to the bus to communicate with a slave device (see BUS REQ1~ and BUS REQ3~) at time 10. The arbiter of FIG. 4 determines that signal BUSGR3 should be asserted, as shown at time 11 with no BUSGR 1 signal being asserted in response the bus request by processor 11. For processor 15 to gain access to the bus however, it is necessary that the current bus master, processor 13, release the bus, which it does at time 11. This enables processor 15 to take control as address master at time 12. Also at time 12, BUSREL~ is driven high by processor 13, shifting processor 15 from the address master state into the bus master state.

For all cycles, the current bus master drives BUSREL~ low, allowing a requesting device that has been granted the bus actual access to address bus. When BUSREL~ is driven high by the current data master, allowing actual access to the data bus, the current address master shifts into the bus master state. At time 14, for example, BUSGR1 is asserted in response to BUSREQ~ having been asserted back at time 10. Also at time 14, BUSREL~ is driven low by processor 15, allowing access to the address bus by processor 11. At time 16, BUSREL~ is driven high by processor 15, allowing access to the data bus and shifting processor 11 from address master to bus master. The accompanying signals such as A2-31, CONTROL, ADS~, BRDYIN, and DATA0-31 all are driven as shown and as described above.

Those skilled in the art may make various changes and modifications in system design, hardware and software, all without departing from the spirit and scope of this invention which is limited only by the appended claims.

The invention claimed is:

1. A multi-master digital computer system, comprising:

(a) a bus having separate address lines and data lines;

(b) at least first and second master device means connected to the bus for originating bus cycles, each having means for requesting the bus and each having means for releasing the bus, each having addressing means activated during a bus cycle and during an address master state, and each having data means for transmitting information during a subsequent data master state;

(c) at least one slave device means connected to the bus, addressable by the first and second master device means during their respective address master states for receiving or transmitting data during their respective data master states; and (d) an arbiter for arbitrating bus requests by the first and second master device means during the bus cycle, for granting both the address and data lines of the bus to a selected one of the first and second master device means for transmitting to, or receiving data from, the slave device means and for granting only the address lines of the bus to the other master device means to enter the address master state upon its requesting the bus, while the selected master device means is coupled to only the data lines of the bus in the data master state, the arbiter capable of granting the address lines and the data lines separately, thereby accelerating the transfer of the bus from the selected master device means to the other master device means in a pipelining manner.

2. The system of claim 1 wherein the slave device means includes means for providing a ready signal indicating that the bus cycle has been completed and causing the selected master device means to transfer from the data master state to an idle state.

3. The system of claim 2 wherein the means for providing a ready signal comprises a memory slave state machine.

4. The system of claim 2 wherein the means for providing a ready signal comprises an I/O slave state machine.

5. The system of claim 3 wherein the slave state machine comprises a logic array.

6. The system of claim 4 wherein the I/O slave state machine comprises a logic array.

7. The system of claim 1 wherein the addressing means and the data means of the selected master device means are activated at the same time during a bus master state, following the address master state and preceding the data master state.

8. The system of claim 1 further comprising memory means wherein the selected master is enabled to read information from the memory means and to write information into the memory means.

9. The system of claim 8 wherein the bus cycle comprises an I/O or a memory bus cycle, wherein a portion of the memory means is associated with the first master device and selectively comprises a slave device, and the second master comprises the master device during a memory bus cycle.

10. The system of claim 1 wherein the means for requesting the bus and the means for releasing the bus of each of the two master device means comprises a master state machine.

11. The system of claim 10 wherein the master state machine comprises a logic array.

12. The system of claim 1 wherein the arbiter comprises an arbiter state machine.

13. The system of claim 12 wherein the arbiter comprises a logic array.

14. A multi-master digital computer system, comprising:
 (a) a bus having separate address lines and data lines;
 (b) a plurality of master devices, each for originating a bus cycle, connected to the bus, each having addressing means activated during the bus cycle and during an address master state, and each having means for transmitting or receiving data during a subsequent data master state;
 (c) a plurality of slave devices connected to the bus, each addressable by any selected one of the plurality of master devices during its address master state, for receiving or transmitting data during its data master state to a selected one of the plurality of slave devices; and
 (d) bus control means for requesting and releasing both the address and data lines of the bus for the selected master device, for arbitrating bus requests by the master devices and for separately granting the address and data lines of the bus to a selected one of the plurality of master devices, and for granting the address lines of the bus to another master device to enter the address master state upon releasing the address lines of the bus from the selected master device while the selected master device is coupled to only the data lines of the bus in the data master state, the bus control means capable of granting the address lines and the data lines separately, thereby accelerating the transfer of the bus from the selected master device to another master device in a pipelining manner.

15. The system of claim 14 wherein the bus control means comprises means for providing a ready signal indicating that the bus cycle has been completed, and causing the selected master device to transfer from the data master state to an idle state.

16. The system of claim 15 wherein the bus control means further comprises a master state machine for requesting and releasing the bus for the selected master device.

17. The system of claim 16 wherein the bus control means further comprises an arbiter state machine for arbitrating bus requests by the master devices, for granting the bus to a selected master device, and for granting the bus to another master device to enter the address master state upon releasing the bus from the selected master device while the selected master device is in the data master state.

18. The system of claim 17 wherein the slave devices comprise memories and I/O devices and wherein the bus cycles comprise memory bus cycles for referencing the memories and I/O bus cycles for referencing the I/O devices.

19. The system of claim 18 wherein the means for providing a ready signal comprises a memory slave state machine.

20. The system of claim 18 wherein the means for providing a ready signal comprises an I/O slave state machine.

21. The system of claim 20 wherein the master state machine, the arbiter state machine, the memory slave state machine, and the I/O slave state machine each comprises a logic array.

* * * * *